(12) United States Patent
Kazanchyan et al.

(10) Patent No.: US 10,582,693 B1
(45) Date of Patent: Mar. 10, 2020

(54) DOG KENNEL AND SOFA (71) Applicants: Simon Kazanchyan, Burbank, CA (US); Dian Kazanchyan, Burbank, CA (US)

(72) Inventors: Simon Kazanchyan, Burbank, CA (US); Dian Kazanchyan, Burbank, CA (US)

(*) Notice: Subject to any disclaimer, the term of this patent is extended or adjusted under 35 U.S.C. 154(b) by 309 days.

(21) Appl. No.: 15/701,612

(22) Filed: Sep. 12, 2017

(51) Int. Cl.
A01K 1/03 (2006.01)
A01K 1/035 (2006.01)

(52) U.S. Cl.
CPC ............ A01K 1/034 (2013.01); A01K 1/0353 (2013.01)

(58) Field of Classification Search
CPC ........ A01K 1/034; A01K 1/033; A01K 1/035; A01K 1/0353; A01K 1/03
See application file for complete search history.

(56) References Cited

U.S. PATENT DOCUMENTS

| 318,812 | A | * | 5/1885 | Smith | B65D 9/14 217/47 |
| 480,914 | A | * | 8/1892 | Bender | B65D 7/26 220/6 |
| 1,152,899 | A | * | 9/1915 | Moore | E06B 7/28 47/40 |
| 1,198,524 | A | * | 9/1916 | Cunliffe | B65D 7/26 220/6 |
| 1,443,901 | A | * | 1/1923 | Murray | B65D 7/26 220/6 |
| 1,451,468 | A | * | 4/1923 | Olshan | B65D 7/26 220/6 |
| 1,669,300 | A | * | 5/1928 | Hunter | B65D 7/24 220/6 |
| 1,973,952 | A | * | 9/1934 | Golberg | A01K 1/03 119/474 |
| 2,121,658 | A | * | 6/1938 | Gehret | A01K 1/03 119/474 |
| 2,456,419 | A | * | 12/1948 | Jackson | B65D 7/26 220/6 |
| 2,530,148 | A | * | 11/1950 | Bjorklund | A01K 31/08 119/474 |
| 2,965,259 | A | * | 12/1960 | Johnson | B65D 7/26 220/6 |
| 3,058,445 | A | * | 10/1962 | Johnson | A01K 1/03 119/474 |
| 3,330,437 | A | * | 7/1967 | Bellamy | B65D 1/225 220/62 |

(Continued)

FOREIGN PATENT DOCUMENTS

WO 2010033876 A 3/2010

Primary Examiner — Kathleen I Alker (57) ABSTRACT

The dog kennel and sofa is a pet sofa (or pet bed) that may be reconfigured to form a kennel. In the pet sofa configuration, the dog kennel and sofa comprises a bottom panel, a rear panel, and two side panels, which are each padded to provide comfort for the pet that is at rest on the dog kennel and sofa. The dog kennel and sofa may be configured for use as a kennel by moving two hinged panels from a position behind the dog kennel and sofa to locations where they cover the top and front of the dog kennel and sofa. Clips may reinforce the joints where hinged panels meet. The front panel may have a door for insertion and removal of a pet. In some embodiments, a removable divider and second door may be provided to accommodate two pets.

10 Claims, 7 Drawing Sheets

(56) References Cited

U.S. PATENT DOCUMENTS

| | | | | |
|---|---|---|---|---|
| 3,611,994 | A * | 10/1971 | Bailey | A01K 1/0245 119/496 |
| 3,797,461 | A * | 3/1974 | Breeden | A01K 1/033 119/482 |
| 3,896,766 | A * | 7/1975 | Martin | A01K 1/03 119/474 |
| 4,002,287 | A * | 1/1977 | Saveth | B65D 5/324 229/122.23 |
| 4,319,545 | A * | 3/1982 | Sou | A01K 31/06 119/474 |
| 4,445,459 | A * | 5/1984 | Julie | A01K 1/0236 119/28.5 |
| 4,909,188 | A * | 3/1990 | Tominaga | A01K 1/03 119/474 |
| 4,940,016 | A * | 7/1990 | Heath | A01K 1/0125 119/168 |
| 5,038,998 | A * | 8/1991 | Morris | B65D 15/22 206/509 |
| 5,129,364 | A * | 7/1992 | Pirkle | A01K 1/0125 119/167 |
| 5,282,439 | A * | 2/1994 | Oaks | A01K 1/0353 119/28.5 |
| 5,653,194 | A | 8/1997 | Guy | |
| 5,727,499 | A * | 3/1998 | Armington | A01K 1/0125 119/168 |
| 5,727,502 | A * | 3/1998 | Askins | A01K 1/033 119/499 |
| 6,076,485 | A * | 6/2000 | Peeples | A01K 1/0254 119/496 |
| 6,401,995 | B1 * | 6/2002 | Yuille | B60R 7/02 220/483 |
| 6,408,796 | B1 * | 6/2002 | Hampel | A01K 1/0035 119/482 |
| 6,513,456 | B2 * | 2/2003 | Sherman | A01K 1/0218 119/498 |
| 6,540,134 | B1 * | 4/2003 | Rasche | A47G 29/14 220/4.28 |
| 6,688,516 | B1 * | 2/2004 | Ussen | B65D 5/42 119/474 |
| 6,895,898 | B1 * | 5/2005 | Kitch | A01K 1/033 119/416 |
| 6,935,526 | B1 * | 8/2005 | Laggar | E05G 1/00 220/4.29 |
| 6,997,138 | B1 * | 2/2006 | Simpson | A01K 1/033 119/474 |
| 7,520,390 | B2 * | 4/2009 | Sonon | A47F 3/14 206/766 |
| 7,617,797 | B2 * | 11/2009 | Lam | A01K 1/0245 119/28.5 |
| D609,407 | S | 2/2010 | Henley | |
| 7,938,085 | B1 * | 5/2011 | Tsengas | A01K 1/034 119/474 |
| 8,127,719 | B2 * | 3/2012 | Jakubowski | A01K 1/0245 119/474 |
| 8,171,888 | B2 * | 5/2012 | Chou | A01K 1/0254 119/497 |
| 8,267,048 | B2 | 9/2012 | Flannery | |
| 8,347,815 | B2 | 1/2013 | Leung | |
| 8,590,721 | B2 * | 11/2013 | Pasi | B65D 81/36 220/6 |
| 8,763,560 | B2 * | 7/2014 | Chang | A01K 1/0254 119/497 |
| 8,925,492 | B2 * | 1/2015 | Cantwell | A01K 1/0245 119/474 |
| 9,167,799 | B2 * | 10/2015 | Casto | A01K 31/08 |
| 9,750,224 | B2 * | 9/2017 | Kupka | A01K 1/0107 |
| 2002/0148410 | A1 * | 10/2002 | Thomas | A01K 1/0236 119/452 |
| 2003/0037372 | A1 * | 2/2003 | Andriunas | A01K 1/0353 5/95 |
| 2004/0177814 | A1 * | 9/2004 | Godshaw | A01K 1/0254 119/28.5 |
| 2009/0031964 | A1 | 2/2009 | Proxmire | |
| 2010/0077961 | A1 * | 4/2010 | Lipscomb | A01K 15/02 119/28.5 |
| 2012/0318206 | A1 | 12/2012 | van Leeuwen | |
| 2013/0180463 | A1 * | 7/2013 | Messner | A01K 1/0353 119/498 |
| 2014/0026819 | A1 * | 1/2014 | White | A01K 1/03 119/455 |
| 2016/0073608 | A1 | 3/2016 | Huang | |
| 2016/0138322 | A1 * | 5/2016 | Link | A01K 1/034 49/394 |
| 2016/0192615 | A1 | 7/2016 | Parnes | |
| 2016/0338315 | A1 * | 11/2016 | Floyd | A01K 1/029 |
| 2019/0150399 | A1 * | 5/2019 | Lu | A01K 1/035 |

* cited by examiner

DOG KENNEL AND SOFA

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet care, more specifically, a dog kennel and sofa.

SUMMARY OF INVENTION

The dog kennel and sofa is a pet sofa (or pet bed) that may be reconfigured to form a kennel. In the pet sofa configuration, the dog kennel and sofa comprises a bottom panel, a rear panel, and two side panels, which are each padded to provide comfort for the pet that is at rest on the dog kennel and sofa. The dog kennel and sofa may be configured for use as a kennel by moving two hinged panels from a position behind the dog kennel and sofa to locations where they cover the top and front of the dog kennel and sofa. Clips may reinforce the joints where hinged panels meet. The front panel may have a door for insertion and removal of a pet. In some embodiments, a removable divider and second door may be provided to accommodate two pets.

An object of the invention is to provide a pet sofa that is convertible into a kennel.

Another object of the invention is to perform the conversion from pet sofa to kennel and back again by moving hinged panels.

A further object of the invention is to secure the panels in place using a locking groove and a plurality of clips.

Yet another object of the invention is to provide a removable interior divider wall so that two pets may be accommodated in the kennel.

These together with additional objects, features and advantages of the dog kennel and sofa will be readily apparent to those of ordinary skill in the art upon reading the following detailed description of the presently preferred, but nonetheless illustrative, embodiments when taken in conjunction with the accompanying drawings.

In this respect, before explaining the current embodiments of the dog kennel and sofa in detail, it is to be understood that the dog kennel and sofa is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dog kennel and sofa.

It is therefore important that the claims be regarded as including such equivalent construction insofar as they do not depart from the spirit and scope of the dog kennel and sofa. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the word "substantially" is intended to mean that two or more values are the same except for a margin of error related to variances in materials, manufacturing processes, craftsmanship, installation, environmental conditions, or other factors that may influence the values or the measurement of the values; it is also intended to mean that this margin of error is tolerable. As used herein, the word "grille" is intended to mean a first plurality of parallel, co-planar metal bars, rods, wires, or other armatures that are coupled to and held in place by a second plurality of parallel, co-planar metal bars, rods, wires, or other armatures.

Detailed reference will now be made to a first potential embodiment of the disclosure, which is illustrated in FIGS. 1 through 7.

The dog kennel and sofa 100 (hereinafter invention) comprises a kennel bottom 200, a rear panel 205, a left panel 210, a right panel 215, a top panel 220, a front panel 230, a set of front-to-top hinges 300, a set of top-to-rear hinges 310, a bottom pad 400, a rear pad 405, a left side pad 410 and a right side pad 415. The invention 100 may be a pet sofa with panels that can be rearranged to form a kennel. When configured as the pet sofa, the invention 100 may be an open, padded area where a pet (not illustrated in the figures) may sleep and the pet may be free to enter and exit the invention 100 whenever it wishes to do so. When configured as the kennel, the invention 100 may be an enclosed cage-like structure where the pet may be confined to the interior of the kennel.

The invention 100 has a bottom 500, a top 505, a front 510, a rear 515, a left 520 side, and a right 525 side. The kennel bottom 200 may be a rectangular panel on the bottom 500 of the invention 100. The kennel bottom 200 may rest upon a floor. The kennel bottom 200 may be coupled to the rear panel 205, the left panel 210, and the top panel 220. The rear panel 205 may extend upwards from the kennel bottom 200 along the rear 515 edge of the kennel bottom 200. The left panel 210 may extend upwards from the kennel bottom 200 along the left 520 edge of the kennel bottom 200. The right panel 215 may extend upwards from the kennel bottom 200 along the right 525 edge of the kennel bottom 200.

The specific dimensions of the kennel bottom 200, the rear panel 205, the left panel 210 may vary based upon the size of the pet that is to be accommodated. The heights above the floor of the rear panel 205, and the right panel 215 may all be substantially the same.

The top panel 220 may be hingedly coupled to the rear panel 205. Specifically, the rear 515 edge of the top panel 220 may be hingedly coupled to the top 505 edge of the rear panel 205 via the set of top-to-rear hinges 310. The top panel 220 may be substantially the same size as the kennel bottom 200. When the invention 100 is being used as the kennel, the top panel 220 is oriented horizontally and is parallel to the floor.

The front panel 230 may be hingedly coupled to the top panel 220. Specifically, the top 505 edge of the front panel 230 may be hingedly coupled to the front 510 edge of the top panel 220 via the set of front-to-top hinges 300. The front panel 230 may be substantially the same size as the rear panel 205. When the invention 100 is being used as the kennel, the front panel 230 is oriented vertically and is perpendicular to the floor.

Figure 1:
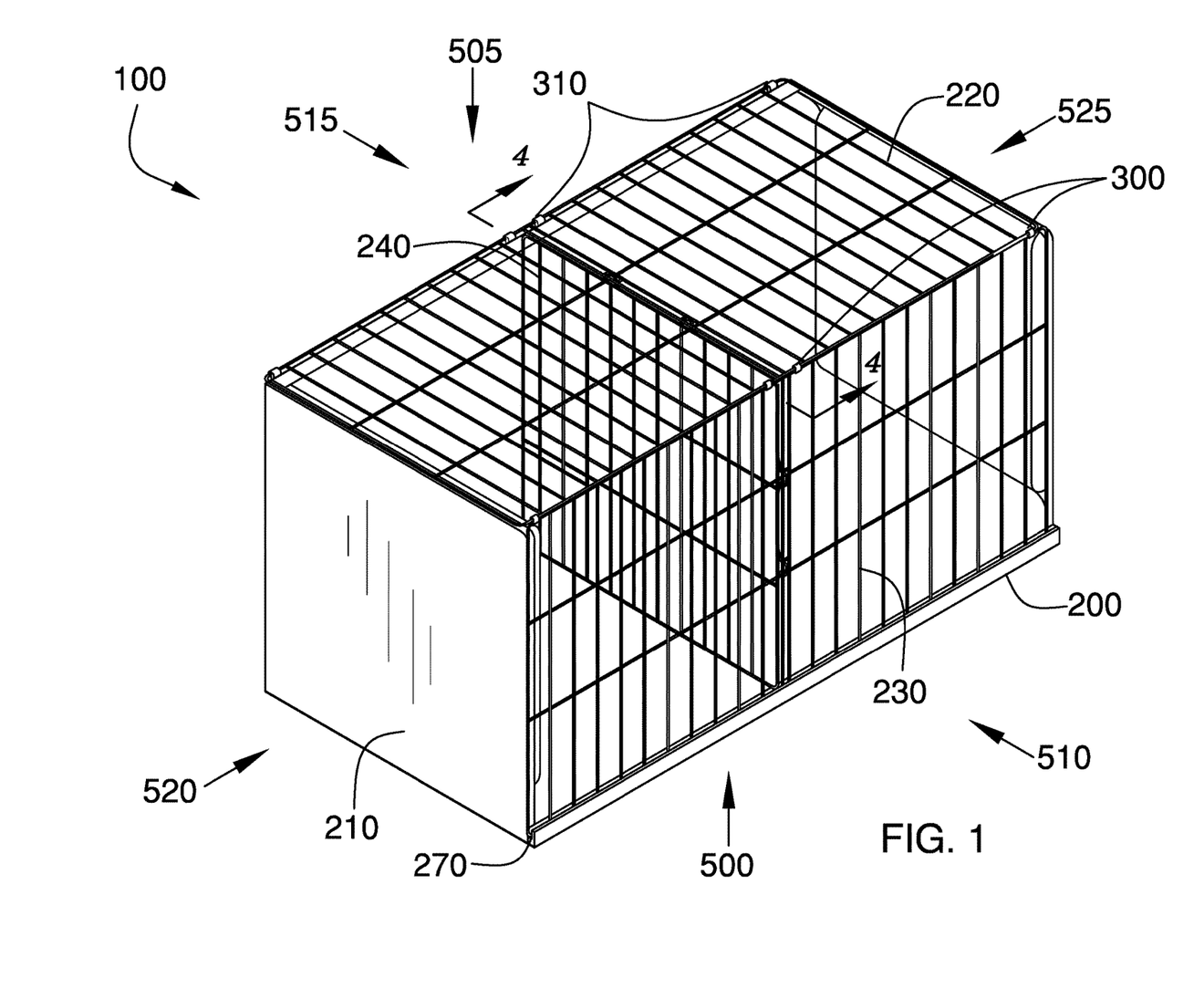
FIG. 1 is a perspective view of an embodiment of the disclosure when configured as a kennel.
Figure 2:
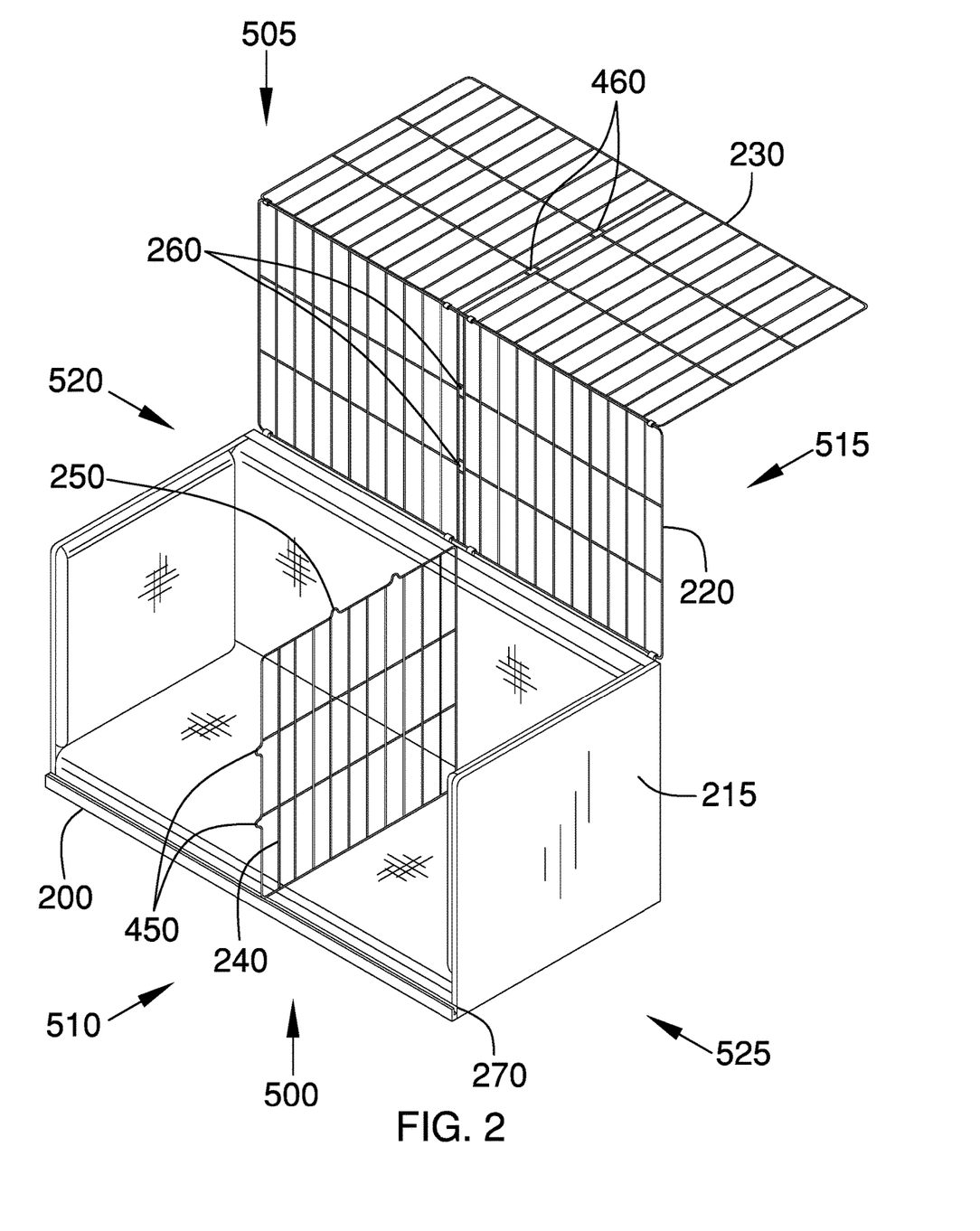
FIG. 2 is a perspective view of an embodiment of the disclosure showing the movement o hinged panels.
Figure 3:
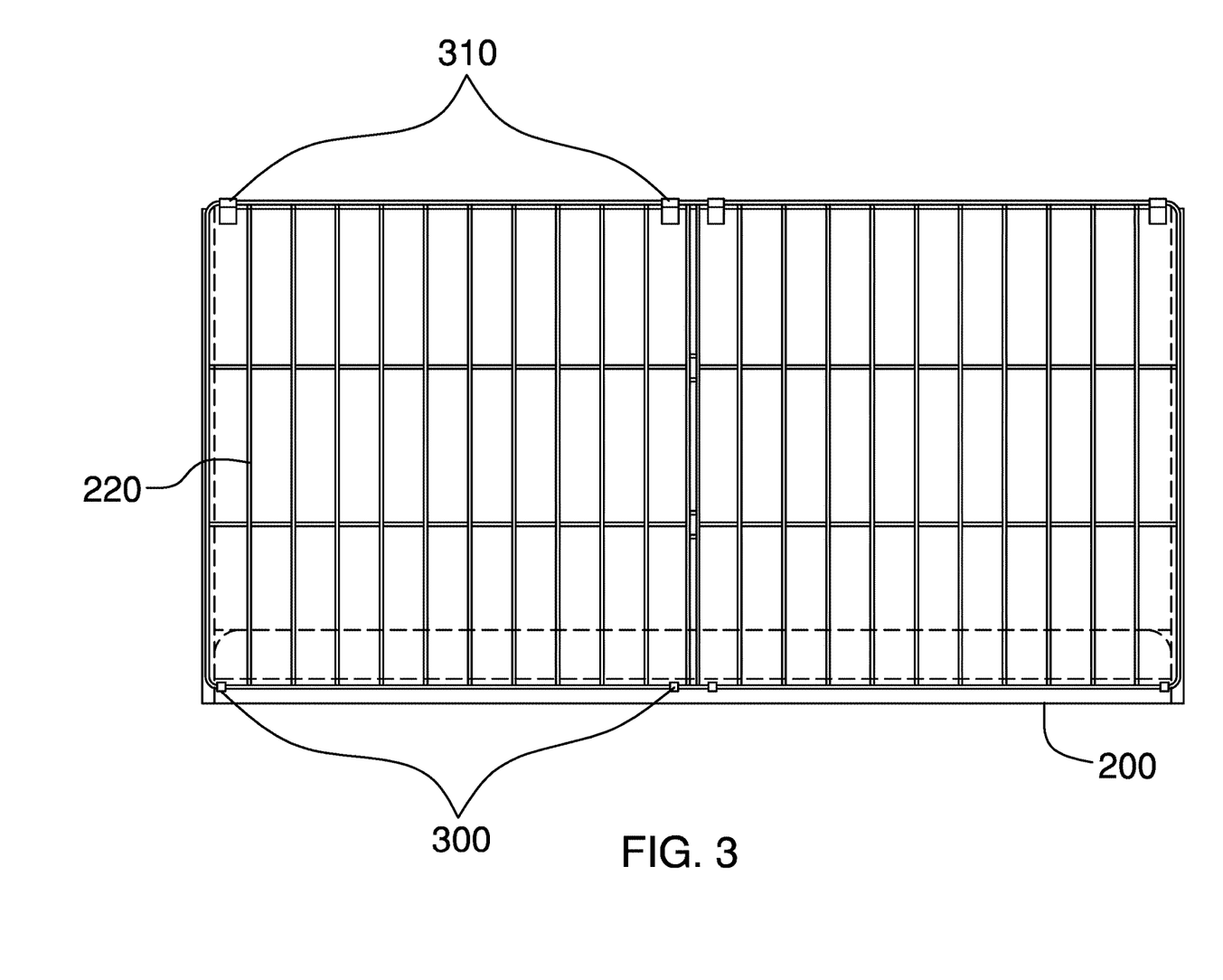
FIG. 3 is a rear view of an embodiment of the disclosure.
Figure 4:
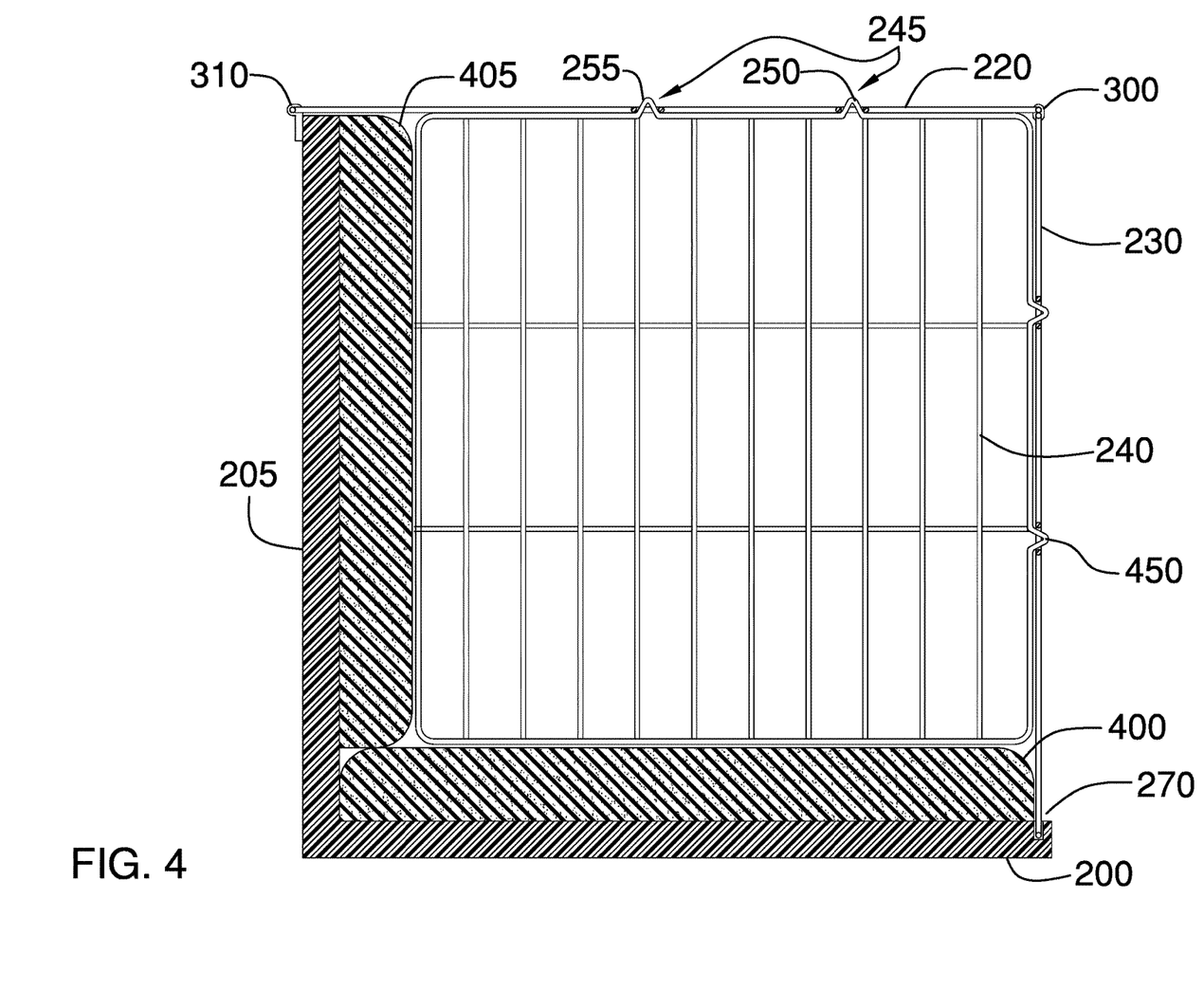
FIG. 4 is a cross-sectional view of an embodiment of the disclosure across 4-4 as shown in FIG. 1.
Figure 5:
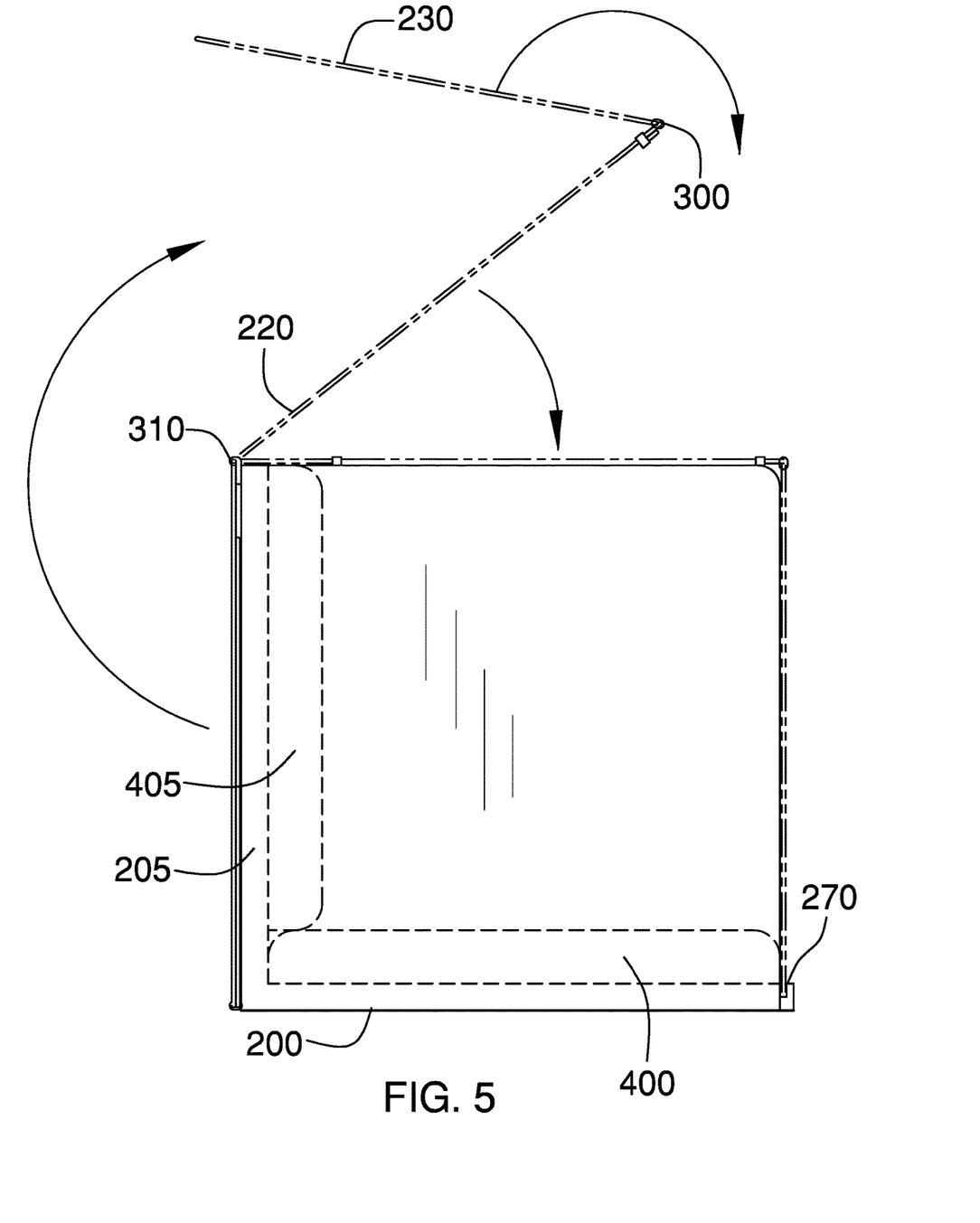
FIG. 5 is a side view of an embodiment of the disclosure.

When the invention 100 is to be used as the pet sofa, the top panel 220 and the front panel 230 are not needed and must be moved out of the way. This is accomplished by hinging the bottom 500 of the front panel 230 forward and up, pivoting at the set of front-to-top hinges 300, through an angle of 270 degrees which results in the front panel 230 lying on top of the top panel 220. Then the top panel 220 and the front panel 230 together may be hinged up by lifting the front 510 of both and pivoting them back around the set of top-to-rear hinges 310, through an angle of 270 degrees which results in the top panel 220 and the front panel 230 being in a position behind the rear panel 205.

Figure 6:
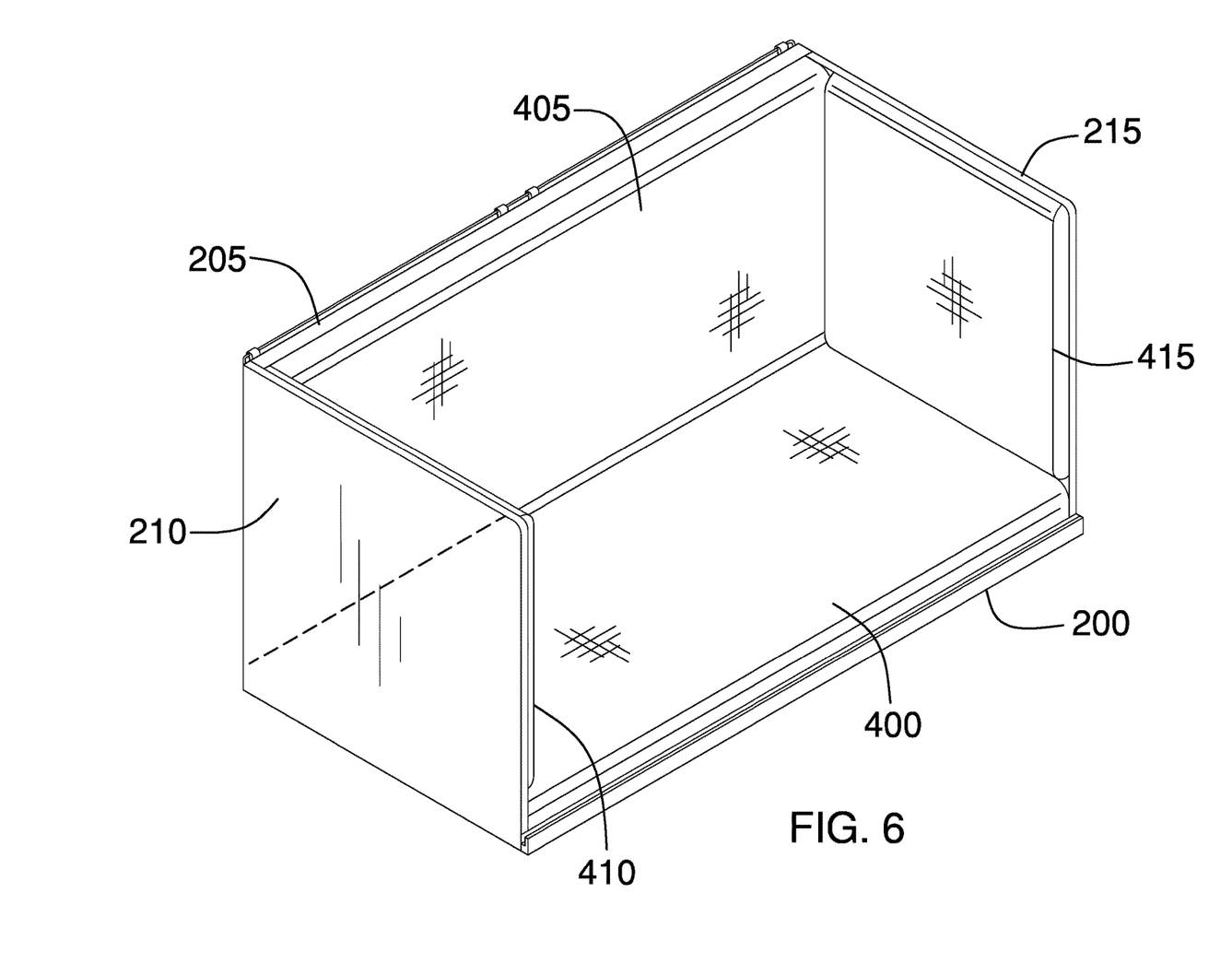
FIG. 6 is a perspective view of an embodiment of the disclosure when configured as a sofa.

When the invention 100 is being used as the pet sofa, the bottom pad 400, the rear pad 405, the left side pad 410, and the right side pad 415 may be disposed within the invention 100 to provide cushioning for the pet. Specifically, the bottom pad 400 may be placed horizontally upon the kennel bottom 200, the rear pad 405 may be placed vertically against the rear panel 205, the left side pad 410 may be placed vertically against the left panel 210, and the right side pad 415 may be placed vertically against the right panel 215.

When the invention 100 is being used as the kennel, use of the bottom pad 400, the rear pad 405, the left side pad 410, and the right side pad 415 is optional.

A divider panel 240 may be a rectangular panel that installs within the invention 100 to separate the invention 100 into two spaces, which may each hold a pet. The divider panel 240 may be oriented so that it is substantially parallel to both the left panel 210 and the right panel 215. The dimensions of the divider panel 240 may substantially match the dimensions of the left panel 210 and the right panel 215. The divider panel 240 may generally divide the invention 100 into two substantially equal sized spaces. In some embodiments, the invention 100 may provide multiple locations where the divider panel 240 may be installed, including locations where unequally sized spaces may result.

The divider panel 240 may be retained in place by utilizing a plurality of temporary couplings 245 to two or more retaining panels. The retaining panels are the kennel bottom 200, the rear panel 205, the top panel 220, and the front panel 230. As a non-limiting example, a temporary coupling 250 selected from the plurality of temporary couplings 245 may take the form of a protrusion 255 on an edge of the divider panel 240, which slides into a slot 260 on one of the retaining panels. As a further non-limiting example, the protrusion 255 may be an outward bend of the armature making up the divider panel 240 and the slot 260 may be a cutout in one of the retaining panels or a space between adjacent armatures making up one of the retaining panels. Installing the divider panel 240 may involve placing it into position against the kennel bottom 200 and the rear panel 205 and then moving the top panel 220 and the front panel 230 into position around the divider panel 240.

In some embodiments, the divider panel 240 may be hingedly coupled to another panel and may pivot into place for dividing the interior space of the kennel. As non-limiting examples, the divider panel 240 may be hingedly coupled to the kennel bottom 200 or to the rear panel 205.

The kennel bottom 200 may comprise a locking groove 270. The locking groove 270 may be a channel running parallel to the front 510 edge of the kennel bottom 200 and depressed into the surface of the kennel bottom 200. When the invention 100 is configured as the kennel, the bottom 500 edge of the front panel 230 may fit into the locking groove 270 to help hold the front panel 230 in place.

The invention 100 may comprise a plurality of panel clips 450 which may be used to temporarily couple a first panel to a second panel. The first panel and the second panel may be the kennel bottom 200, the rear panel 205, the left panel 210, the top panel 220, and the front panel 230. Each of the plurality of panel clips 450 may be hardware that is permanently attached to and free to pivot about an edge of the first panel and which may engage an edge of the second panel in at least one pivot position. As a non-limiting example, one of the plurality of panel clips 450 may be a bent armature made from a stiff, flexible material with a first end that pivotally attaches to the first panel and a second end that may be curled to temporarily grasp a portion of the second panel. At each panel coupling where the plurality of panel clips 450 may be used to couple the first panel to the second panel, any number of the plurality of panel clips 450 may be used to couple the first panel to the second panel.

As non-limiting examples, the plurality of panel clips 450 may be used to temporarily couple the top panel 220 to the left panel 210, the top panel 220 to the right panel 215, the front panel 230 to the left panel 210, the front panel 230 to the right panel 215, or the kennel bottom 200 to the front panel 230.

In some embodiments, the rear panel 205, the left panel 210, the right panel 215, the top panel 220, the front panel 230, and the divider panel 240 may be grilles that allow air to flow through the invention 100.

In some embodiments, the rear panel 205, the left panel 210, and the right panel 215 may each individually be hingedly coupled to the kennel bottom 200 thus allowing them to fold down into the kennel bottom 200 for more efficient storage of the invention 100.

Figure 7:
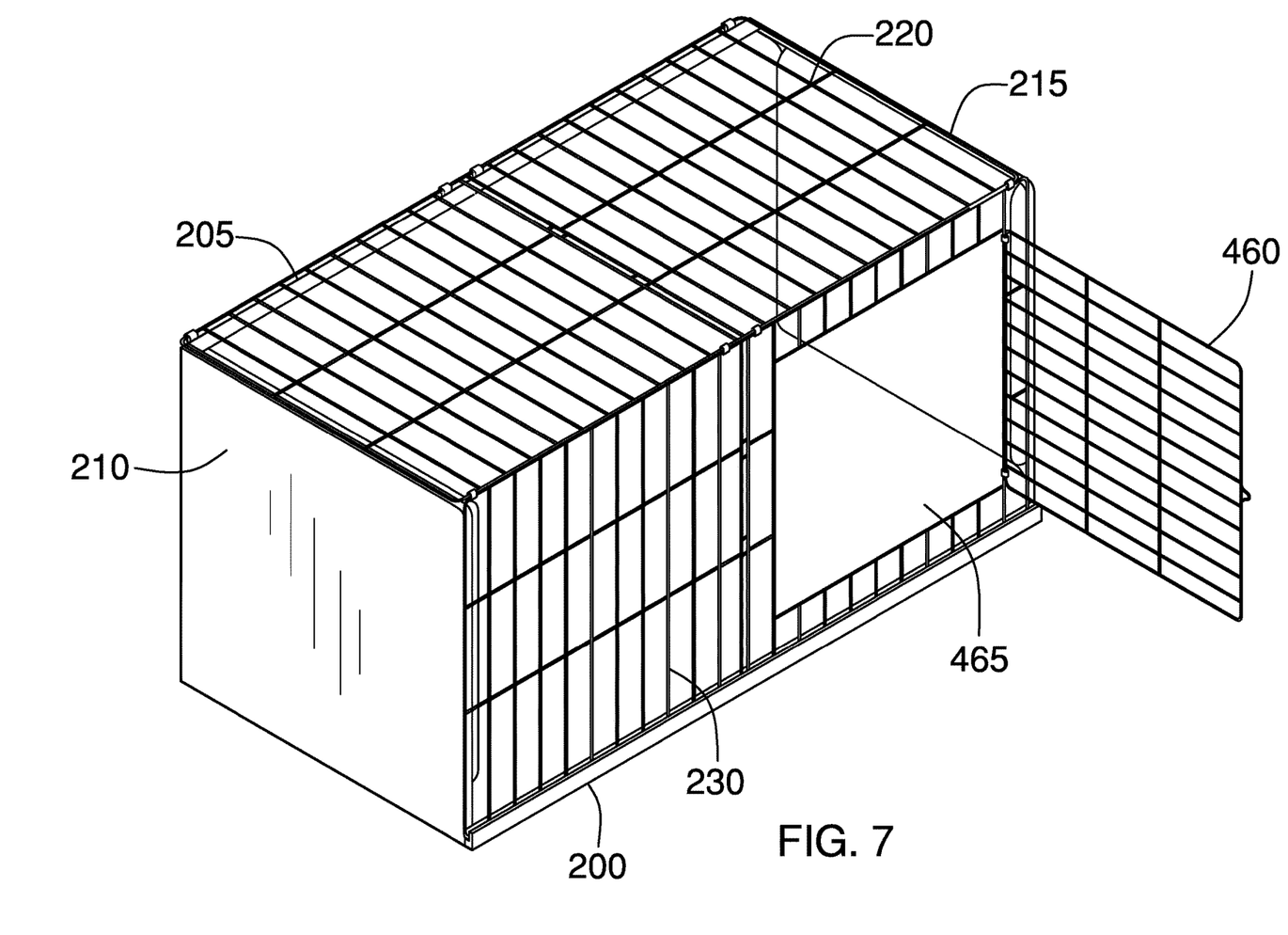
FIG. 7 is a perspective view of an embodiment of the disclosure when configured as a kennel and showing a first door.

In some embodiments, the front panel 230 may comprise a first door 460. In these embodiments an opening 465 in the front panel 230 may allow the pet to be removed from the kennel and the first door 460 may hingedly attach to the front panel 230 in such a way that the first door 460 may be pivoted to cover the first door 460. One or more of the plurality of panel clips 450 may be used on the front panel 230 to prevent the first door 460 from opening when it is desired to keep the kennel closed.

In some embodiments, the front panel 230 may comprise a second door (not illustrated in the figures). When the second door is provided, the first door 460 and the second door may be positioned on opposite sides of the divider panel 240 so that the divider panel 240 may be used to create two internal spaces and pets in each of the internal spaces may be removed from or placed into the kennel individually.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dog kennel and sofa comprising:
a kennel bottom, a rear panel, a left panel, a right panel, a top panel, a front panel, a set of front-to-top hinges, a set of top-to-rear hinges, a bottom pad, a rear pad, a left side pad and a right side pad;
wherein the dog kennel and sofa is a pet sofa with panels that can be rearranged to form a kennel;
wherein the pet sofa is adapted to be an open, padded area where a pet sleeps and the pet is free to enter and exit the dog kennel and sofa whenever it wishes to do so;
wherein the kennel is adapted to be an enclosed cage-like structure where the pet is confined to the interior of the kennel;
wherein the dog kennel and sofa has the kennel bottom, a top, a front, a rear, a left side, and a right side;
wherein the kennel bottom is a rectangular panel on the bottom of the dog kennel and sofa;
wherein the kennel bottom is configured to rest upon a floor;
wherein the kennel bottom is coupled to the rear panel, and the left panel;
wherein the rear panel extends upwards from the kennel bottom along a rear edge of the kennel bottom;
wherein the left panel extends upwards from the kennel bottom along a left edge of the kennel bottom;
wherein the right panel extends upwards from the kennel bottom along a right edge of the kennel bottom;
wherein when the dog kennel and sofa is to be used as the pet sofa, the top panel and the front panel are moved out of the way by hinging a bottom of the front panel forward and up, pivoting at the set of front-to-top hinges, through an angle of 270 degrees which results in the front panel lying on top of the top panel and the top panel and the front panel are then hinged up by lifting a front of both and pivoting them back around the set of top-to-rear hinges, through an angle of 270 degrees, which results in the top panel and the front panel being in a position behind the rear panel;
wherein when the dog kennel and sofa is being used as the pet sofa, the bottom pad, the rear pad, the left side pad, and the right side pad are disposed within the dog kennel and sofa to provide cushioning;
wherein the bottom pad is placed horizontally upon the kennel bottom, the rear pad is placed vertically against the rear panel, the left side pad is placed vertically against the left panel, and the right side pad is placed vertically against the right panel;
wherein the front panel comprises a first door;
wherein an opening in the front panel is adapted to allow the pet to be removed from the kennel;
wherein the first door is hingedly attached to the front panel in such a way that the first door pivots to cover the opening.

2. The dog kennel and sofa according to claim 1
wherein the heights of the rear panel, and the right panel are all substantially the same.

3. The dog kennel and sofa according to claim 2
wherein the top panel is hingedly coupled to the rear panel;
wherein the rear edge of the top panel is coupled to a top edge of the rear panel via the set of top-to-rear hinges;
wherein the top panel is substantially the same size as the kennel bottom;
wherein the kennel, the top panel is oriented horizontally and is parallel to the floor.

4. The dog kennel and sofa according to claim 3
wherein the front panel is hingedly coupled to the top panel;
wherein the top edge of the front panel is coupled to a front edge of the top panel via the set of front-to-top hinges;
wherein the front panel is substantially the same size as the rear panel;
wherein when the dog kennel and sofa is being used as the kennel, the front panel is oriented vertically and is perpendicular to the floor.

5. The dog kennel and sofa according to claim 4
wherein a divider panel is a rectangular panel that is installed within the dog kennel and sofa to separate the dog kennel and sofa into two spaces;
wherein the divider panel is oriented so that it is substantially parallel to both the left panel and the right panel.

6. The dog kennel and sofa according to claim 5
wherein the divider panel divides the dog kennel and sofa into two substantially equal sized spaces.

7. The dog kennel and sofa according to claim 5
wherein the divider panel is retained in place by utilizing a plurality of temporary couplings.

8. The dog kennel and sofa according to claim 7
wherein a temporary coupling selected from the plurality of temporary couplings takes the form of a protrusion on an edge of the divider panel which slides into a slot on one of the retaining panels.

9. The dog kennel and sofa according to claim 4
wherein the kennel bottom comprises a locking groove;
wherein the locking groove is a channel running parallel to the front edge of the kennel bottom and depressed into the surface of the kennel bottom;
wherein when the dog kennel and sofa is configured as the kennel, the bottom edge of the front panel fits into the locking groove to help hold the front panel in place.

10. The dog kennel and sofa according to claim 4
wherein the rear panel, the left panel, the right panel, the top panel, the front panel, and a divider panel are grilles that allow air to flow through the dog kennel and sofa.

\* \* \* \* \*